US006291610B1

United States Patent
Holtcamp

(12) United States Patent
(10) Patent No.: US 6,291,610 B1
(45) Date of Patent: Sep. 18, 2001

(54) HALOARYL CONTAINING GROUP 13 SUBSTITUENTS ON BRIDGED METALLOCENE POLYOLEFIN CATALYSTS

(75) Inventor: Matthew W. Holtcamp, Huffman, TX (US)

(73) Assignee: Univation Technologies, LLC

( * ) Notice: Subject to any disclaimer, the term of this patent is extended or adjusted under 35 U.S.C. 154(b) by 0 days.

(21) Appl. No.: 09/451,833

(22) Filed: Nov. 30, 1999

Related U.S. Application Data

(60) Provisional application No. 60/112,900, filed on Dec. 18, 1998.
(51) Int. Cl.[7] ................. C08F 4/16; C08F 4/52
(52) U.S. Cl. ............ 526/127; 526/133; 526/160; 526/348.6; 526/943; 502/117; 502/152
(58) Field of Search ............... 526/133, 134, 526/160, 943, 348.6, 127

(56) References Cited

U.S. PATENT DOCUMENTS

| 5,496,960 | 3/1996 | Piers et al. ............... 556/8 |
| 5,712,354 | 1/1998 | Boncella et al. ............... 526/127 |
| 5,792,819 | * 8/1998 | Erker et al. ............... 522/134 |

FOREIGN PATENT DOCUMENTS

| 0694548 A1 | 1/1996 | (EP) . |
| 0739897 A1 | 10/1996 | (EP) . |
| 0748821 A1 | 12/1996 | (EP) . |
| 0856518 A1 | 8/1998 | (EP) . |
| WO 99/64476 | 12/1999 | (WO) . |

OTHER PUBLICATIONS

Piers et al., Toward One–Component Group 4 Homogeous Ziegler–Natta Olefin Polymerization Catalyst:, Organometallics 1995, 14, 4617–4624.*
Mu et al., Can. J. Chem. 74: 1696–1703 (1996).
von H. Spence et al., Angew. Chem. Int. Ed. Engl. 1995, 34, No. 11, 1230–1233.
Sun et al., Organometallics 1997, 16, 2509–2513.
Sun et al., J. Am. Chem. Soc. 1997, 119, 5132–5143.
Parks et al., Angew. Chem. Int. Ed. Engl. 1995, 34, No. 7, 809–811.
v. H. Spence et al., Organometallics 1995, 14, 4617–4624.
Shafiq et al., Organometallics 1998, 17, 982–985.
Duchateau et al., Organometallics 1997, 16, 4995–5005.

* cited by examiner

Primary Examiner—David W. Wu
Assistant Examiner—R. Harlan
(74) Attorney, Agent, or Firm—Jaimes Sher; Lisa Kimes Jones

(57) ABSTRACT

A process for the preparation of polyolefins from one or more olefinic monomers is described in which the olefin arc combined with a catalyst complex derived from a catalyst compound having a bis-haloaryl-Group 13 element substituted Group 13–15 atom-containing bridging element, and a co-catalyst activator a tri-n-alkyl aluminum compound or aluminoxy derivative thereof. The process is particularly useful with bisarylboron substituted silicon-bridged metallocenes under gas phase, slurry, solution or supercritical high pressure coordination polymerization conditions for polyolefins derived from olefinic monomers selected from the group consisting of ethylene, (α-olefins, cyclic olefins, non-conjugated diolefins, vinyl aromatic olefins, and geminally disubstituted olefins.

10 Claims, 1 Drawing Sheet

HALOARYL CONTAINING GROUP 13 SUBSTITUENTS ON BRIDGED METALLOCENE POLYOLEFIN CATALYSTS

CROSS-REFERENCES TO RELATED APPLICATIONS

This patent application claims priority from Provisional U.S. Application Serial No. 60/112,900, filed Dec. 18, 1998, which is herein fully incorporated by reference.

TECHNICAL FIELD

This invention relates to a process for coordination polymerization of olefins using metallocenes having pendant, boron based Lewis acid groups.

BACKGROUND ART

Boron based Lewis acids having fluorinated aryl substituents are known to be capable of activating transition metal compounds into olefin polymerization catalysts. Trisperfluorophenylborane is taught in EP 0 520 732 to be capable of abstracting a ligand for certain cyclopentadienyl derivatives of transition metals while providing a stabilizing, compatible noncoordinating anion. The term "noncoordinating anion" is now accepted terminology in the field of olefin polymerization, both by coordination or insertion polymerization and carbocationic polymerization. See, for example, EP 0 277 004, U.S. Pat. No. 5,198,401, and Baird, Michael C., et al, *J. Am. Chem. Soc.* 1994, 116, 6435–6436, and U.S. Pat. No. 5,668,324. The noncoordinating anions are described to function as electronic stabilizing cocatalysts, or counterions, for cationic metallocene complexes which are active for olefin polymerization. The term noncoordinating anion as used here applies both to truly noncoordinating anions and coordinating anions that are at most weakly coordinated to the cationic complex so as to be labile to replacement by olefinically or acetylenically unsaturated monomers at the insertion site.

Organoaluminum compounds are known to be useful with metallocene based transition metal cationic catalysts, as cocatalyst activators, or for those stabilized with noncoordinating anions, for both catalyst poison inhibition and alkylation of metallocene dihalide compounds, see WO 91/14713 and EP 0 500 944. See also WO 93/14132 where alumoxane compounds are said to be useful for inhibiting catalyst poisons in the presence of cationic, cyclopentadienyl Group 4 complexes activated by tris(perfluorophenyl) boron.

Certain metallocene compounds having pendant, boron based Lewis acid groups are described by R. E. v. H. Spence and W. E. Piers in "Toward One-Component Group 4 Homogenous Ziegler-Natta Olefin Polymerization Catalysts: Hydroboration of Zirconium bisalkyl with Pendant 2-Propenyl Groups Using [$(C_6F_5)_2BH$]$_2$", *Organomatallics* 1995, 14, 4617–4624. As indicated in the title, compounds having boron based Lewis acids having fluorinated aryl substituents linked to cyclopentadienyl ring carbon atoms via hydroboration of propenyl groups that are pendant to cyclopentadienyl ligands are disclosed. It is suggested that these compounds will have utility as zwitterionic, self-activating catalysts. See also the zwitterionic catalysts of U.S. Pat. No. 5,792,819 where pendant, boron based Lewis acid groups are attached to a Group 4 metal center.

The synthesis of Group 13-based compounds derived from trisperfluorophenylborane are described in EP 0 694 548. These compounds are said to be represented by the formula $M(C_6F_5)_3$ and are prepared by reacting the trisperfluorophenylborane with dialkyl or trialkyl Group 13-based compounds at a molar ratio of "basically 1:1" so as to avoid mixed products, those including the type represented by the formula $M(C_6F_5)_nR_{3-n}$, where n=1 or 2. Utility for the trisaryl aluminum compounds in Ziegler-Natta olefin polymerization is suggested.

BRIEF SUMMARY OF THE INVENTION

The invention comprises a process for the preparation of polyolefins from one or more olefinic monomers comprising combining said olefins with a novel catalyst complex derived from: i) a metallocene catalyst compound having a Group 13–15 bridging element substituted with a Group 13 moiety containing two halogenated aromatic groups, and ii) an alkyl aluminum compound or aluminoxy derivative thereof. In the invention, the pendant, Lewis acidic Group 13 moiety is bonded to the metallocene through the bridging Group 13–15 atom that is also covalently bonded to at least one cyclopentadienyl ring atom of a metal ligand and to a second ancillary metal ligand that may be another, same or different, cyclopentadienyl ring ligand or a heteroatom ligand of the same metal center. Increased activities, over those with similar metallocenes not having the pendant boron groups and similarly activated with alumoxane compounds, have been observed with the invention catalysts.

DETAILED DESCRIPTION OF THE INVENTION

Figure 1:
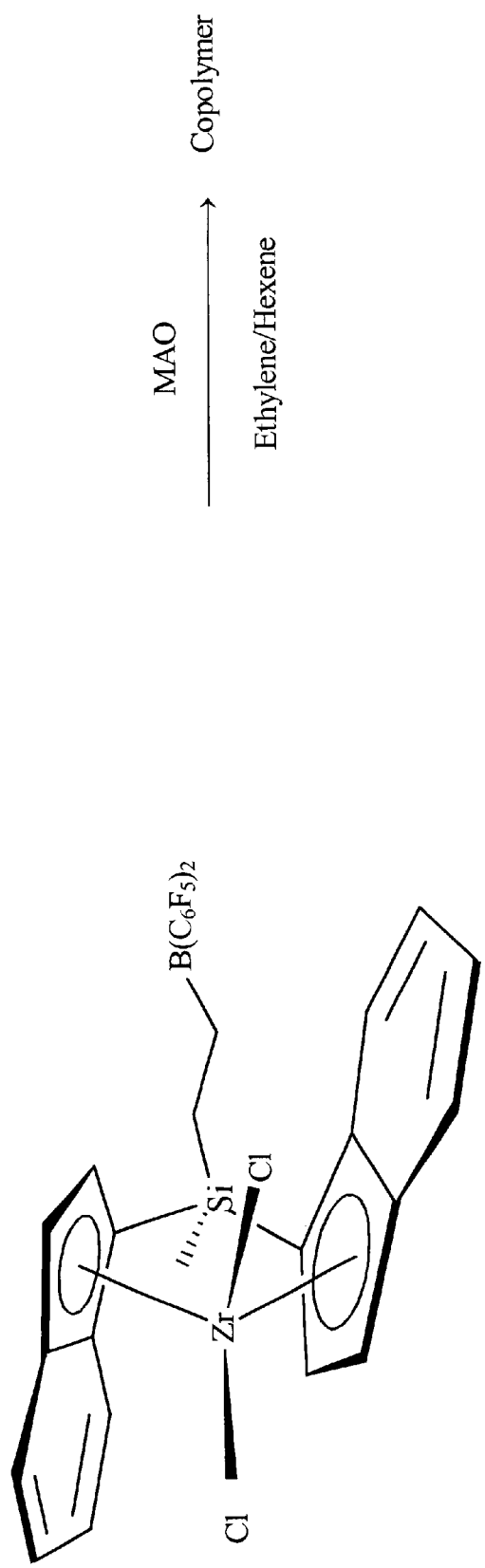
FIG. 1 illustrates an example of the invention where the compound $CH_3((C_6F_5)_2BCH_2CH_2)Si(Ind)_2ZrCl_2$, where "Ind" refers to an indenyl ligand, is activated with methylalumoxane ("MAO") and used to prepare an ethylene-hexene copolymer.

The invention summarized above can be more specifically represented as an olefin polymerization process using a novel catalyst composition derived from a metallocene compound having the formula:

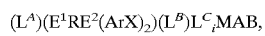

$(L^A)(E^1RE^2(ArX)_2)(L^B)L^C_iMAB$, where $L^A$ is a substituted or unsubstituted cyclopentadienyl or heterocyclopentadienyl ancillary ligand π-bonded to M; $L^B$ is a member of the class of ancillary ligands defined for $L^A$, or is J, a heteroatom ancillary ligand bonded to M; $E^1$ is a Group 13–15 atom-containing linking group covalently bonded to $L^A$ and $L^B$, said Group 13–15 atom preferably being, Si, C, Ge, N or P; R is a monovalent group covalently bonded to $E^1$; $E^2(ArX)$ is a Group 13, preferably B or Al, moiety containing two halogenated aromatic groups, said moiety covalently bonded to $E^1$; $L^C_i$ is one or more optional, neutral non-oxidizing ligand having a dative bond to M (i equals 0 to 3); M is a Group 3–6 transition metal; and, A and B are independently monoanionic labile ligands, each having σ-bond to M, optionally bridged to each other or $L^A$ or $L^B$, which can be broken or replaced for abstraction purposes by a suitable activator and into which a polymerizable monomer or macromonomer can insert for coordination polymerization.

The substituted or unsubstituted cyclopentadienyl or heterocyclopentadienyl ancillary ligands represented by $L^A$ are generally characterized by a 5-member aromatic ring consisting essentially of carbon atoms, which may contain as substituents for one or more ring hydrogen atoms, hydrocarbyl groups, preferably $C_1$ to $C_{30}$, where one or more carbons may be replaced with a Group 13–16 heteroatom, including one or more pendant and/or fused substituted or unsubstituted rings, ring optional substituents typically consisting of $C_1$ to $C_{10}$ hydrocarbyl or hydrocarbylsilyl groups. As is known in the art, the 5-member aromatic ring may have a ring carbon atom replaced with a Group 13–15 heteroatom and still be capable of π-bonding to M. Similarly, the skilled artisan will recognize that all of indenyl, fluorenyl, azulenyl, and heterocyclic analogs thereof, are suitable substituted derivatives of 5-member aromatic rings. Typically such ligands are known in the art for organometallic metallocene compounds, and accordingly methods for the synthesis of metallocenes containing such ligands are known. See, for example, U.S. Pat. Nos. 5,278, 264, 5,304,614, 5,324,800, 5,324,801, 5,502,124 and WO 95/04087, each of which is incorporated by reference for purposes of U.S. patent practice.

The heteroatom ancillary ligand J is typically a Group 15 or 16 element, where if group 15 is generally substituted with a $C_1$ to $C_{30}$ hydrocarbyl group as defined for the substituents for $L^A$. Compounds having a J ligand are typically known as monocyclopentadienyl metallocene compounds and the substantial art relating thereto is instructive as to selection and synthesis of compounds containing such. See, for example U.S. Pat. Nos. 5,055,438, 5,264,505, 5,625,016, 5,635,573 and 5,763,556.

For the bridging group $E^1RE^2(ArX)_2$, R is typically a $C_1$ to $C_{10}$ hydrocarbyl group covalently linking the $E^2$ atom to the $E^1$ atom. One or more carbon atoms in the linking chain between the $E^2$ atom and the $E^1$ atom may be substituted with a short chain, e.g., $C_1$ to $C_6$, hydrocarbyl or hydrocarbylsilyl group as well. "ArX" refers to a halogenated aromatic group, preferably a $C_6$ or a $C_5N$ aromatic group, or derivative thereof, having at least three halogen atoms, preferably fluorine, replacing aromatic ring hydrogen atoms. The halogenated aromatic groups may be derived from any aromatic ring, ring assembly, or fused ring ligand suitable as compatible ligands for noncoordinating anions as that term is recognized in the olefin polymerization art. Typical examples include phenyl, napthyl, anthracyl and biphenyl rings. See, e.g., U.S. Pat. No. 5,198,401, WO 97/29845, and the co-pending U.S. application Ser. No. 09/191922 filed Nov. 13, 1998.

The A and B groups are monoanionic labile ligands are typically those hydride, alkyl or halogen ligands known and used for the metallocene catalysts of the prior art. Typical examples include hydride, methyl, ethyl, benzyl, methyl trimethylsilyl, and chlorine. Such alkyl ligands can be generically described as $C_1$ to $C_{20}$ hydrocarbyl substituents where the carbon atom attached to the metal center is a primary carbon atom (—$CH_2R'$).

Silicon-bridged metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,001,205, 5,198,401, 5,324,800, 5,308,816, and 5,304,614 for specific listings. Selection of silicon-bridged metallocene compounds for use to make isotactic or syndiotactic polypropylene, and their syntheses, are well-known in the art, specific reference may be made to both patent literature and academic, see for example Jounral of organometallic Chemistry 369, 359–370 (1989). Typically those catalysts are bridged asymmetric or bridged chiral metallocenes. See, for example, U.S. Pat. Nos. 5,017,714, 5,296,434, 5,278,264, WO-A-(PCT/US92/10066) WO-A-93/19103, EP-A2-0 577 581, EP-A1-0 578 838, and academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalytic Activity and Polymer Chain Lengths", Brinzinger, H., et al, Organometallics 1994, 13, 964–970, and documents referred to therein.

Exemplary compounds according to the invention include: (bispentafluorophenyboryl-ethyl)(methyl)silyl (bisindenyl)zirconiumdichloride or dimethyl, (bispentafluorophenyboryl-ethyl)(methyl)methene (fluorenyl) (cyclopentadienyl) zirconium dichloride or dimethyl, (bispentafluorophenyboryl-ethyl)(phenyl)silyl (fluorenyl)(cyclopentadienyl) zirconium dichloride or dimethyl, (bispentafluorophenyboryl-ethyl)(phenyl)silyl (indenyl) (fluorenyl) zirconium dichloride or dimethyl, (bispentafluorophenyboryl-propyl) (phenyl) silyl (bisindenyl) zirconi-umdichloride or dimethyl, (bispentafluorophenyboryl-ethyl)(hydryl)ethane (bisindenyl) zirconium dichloride or dimethyl, (bispentafluorophenyboryl-ethyl)(methyl)silyl(bisindenyl)hafniumdichloride or dimethyl, (bispentafluorophenylboryl-ethyl)(methyl) methene(fluorenyl) (cyclopenta-dienyl) hafnium dichloride or dimethyl, (bispentafluorophenyboryl-ethyl)(phenyl)silyl (fluorenyl)(cyclopentadienyl) hafnium dichloride or dimethyl, (bispentafluorophenyboryl-ethyl)(phenyl)silyl (indenyl) (fluorenyl) hafnium dichloride or dimethyl, (bispentafluorophenyboryl-propyl) (phenyl) silyl (bisindenyl) hafniumdichloride or dimethyl, (bispentafluorophenyboryl-ethyl)(hydryl)ethane (bisindenyl) hafnium dichloride or dimethyl, (bispentafluorophenyboryl-ethyl) (propyl)silyl (fluorenyl) (n-dodecyl-amido) titaniumdichloride or dimethyl, and (bispentafluorophenyboryl-ethyl)(methyl)silyl (tetramethylcyclopentadienyl)(tert-butylamido) titaniumdichloride or dimethyl. Analogs of the titanium compounds can be prepared with trivalent metals of Groups 3, 5 and 6 within the skill in the art.

Alkylalumoxanes and modified alkylalumoxanes are suitable as catalyst activators, particularly for the invention metal compounds comprising halide ligands. The alumoxane component useful as catalyst activator typically is an oligomeric aluminum compound represented by the general formula (R"—Al—O)$_n$, which is a cyclic compound, or R"(R"—Al-O)$_n$AlR"$_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. Most preferably, R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952, 540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279586 B1, EP 0 516476 A, EP 0 594218 A1 and WO 94/10180, each being incorporated by reference for purposes of U.S. patent practice.

Organoaluminum compounds are also suitable catalyst activators for the organometallic catalyst compounds of the invention. These can be represented by the formulae $Al(R^1)_3$, wherein $R^1$ is independently a hydride or $C_1$ to $C_{30}$ hydrocarbyl including aliphatic, alicyclic or aromatic hydrocarbon radicals. Preferred examples include trimethylaluminum, triethylaluminum, tri-n-propylaluminum, triisobutylaluminum, tri-n-butylaluminum, tri-n-hexylaluminum, tri-n-octylaluminum, tri-n-dodecylaluminum, tri-n-cicosylaluminum, and those aluminum compounds having mixed substitutents including those generically described above.

The catalysts according to the invention may be supported for use in gas phase, bulk, slurry polymerization processes, or otherwise as needed. Numerous methods of support are known in the art for copolymerization processes for olefins, particularly for catalysts activated by alumoxancs, any is suitable for the invention process in its broadest scope. See, for example, U.S. Pat. Nos. 5,057,475 and 5,227,440. An example of supported ionic catalysts appears in WO 94/03056. A bulk, or slurry, process utilizing supported, bis-cyclopentadienyl Group 4 metallocenes activated with alumoxane cocatalysts is described as suitable for ethylene-propylene rubber in U.S. Pat. Nos. 5,001,205 and 5,229,478, these processes will additionally be suitable with the catalyst systems of this application. Both inorganic oxide and polymeric supports may be utilized in accordance with the knowledge in the field. See U.S. Pat. Nos. 5,422,325, 5,498,582, and 5,466,649. Each of the foregoing documents is incorporated by reference for purposes of U.S. patent practice.

In preferred embodiments of the process for this invention, the catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting the olefin monomers with the above described catalyst system in a suitable diluent or solvent and allowing said monomers to react for a sufficient time to produce the invention copolymers. Hydrocarbyl solvents arc suitable, both aliphatic and aromatic, hexane and toluene are preferred. Bulk and slurry processes are typically done by contacting the catalysts with a slurry of liquid monomer, the catalyst system being supported. Gas phase processes similarly use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352,749, 5,436,304, 5,453,471, and 5,463,999, and WO 95/07942. Each is incorporated by reference for purposes of U.S. patent practice.

When using the catalysts of the invention, particularly when immobilized on a support, the total catalyst system may additionally comprise one or more scavenging compounds in amounts effective for the scavenging function. The term "scavenging " as used in this application means effective for removing polar impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an excess of the alkylated Lewis acids needed for initiation, as described above, or will be additional known organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and tri-noctyl octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, tn-n-dodecylaluminum and the higher carbon number tri-n-alkyl aluminum compounds. When alumoxanc is used as an activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with the catalyst compounds of the invention is minimized during polymerization reactions to that amount effective to enhance activity and avoided altogether if the feeds and polymerization medium can be sufficiently free of adventitious impurities, or if the alumoxane or alkyl aluminum compounds are present in sufficient excess over that needed to activate the catalysts.

The catalyst complexes of the invention are useful in polymerization of unsaturated monomers conventionally known to be polymerizable under coordination polymerization using metallocenes. Such conditions are well known and include solution polymerization, slurry polymerization, gas-phase polymerization, and high pressure polymerization. The catalyst of the invention may be supported (preferably as described above) and as such will be particularly useful in the known operating modes employing fixed-bed, moving-bed, fluid-bed, slurry or solution processes conducted in single, series or parallel reactors. Pre-polymerization of supported catalyst of the invention may also be used for further control of polymer particle morphology in typical slurry or gas phase reaction processes in accordance with conventional teachings.

In alternative embodiments of olefin polymerization methods for this invention, the catalyst system is employed in liquid phase (solution, slurry, suspension, bulk phase or combinations thereof), in high pressure liquid or supercritical fluid phase, or in gas phase polymerization processes. Each of these processes may also be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5,352,749, 5,436,304, 5,453,471, and 5,463,999, and WO 95/07942. Each is incorporated by reference for purposes of U.S. patent practice.

Generally speaking the polymerization reaction temperature can vary from about 40° C. to about 250° C. Preferably the polymerization reaction temperature will be from 60° C. to 220°, more preferably below 200° C. The pressure can vary from about 1 mm Hg to 2500 bar, preferably from 0.1 bar to 1600 bar, most preferably from 1.0 to 500 bar.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically <50 bar), at a typical temperature of 40–250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000–3000 kPa and 60–160° C., using hydrogen as a reaction modifier (100–200 PPM), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and 5,405,922 and 5,462,999, which are incorporated by reference for purposes of U.S. patent practice.

Ethylene-α-olefin (including ethylene-cyclic olefin and ethylene-α-olefin-diolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also, international application WO 96/33227 and WO 97/22639. All documents are incorporated by reference for description of polymerization processes, metallocene selection and useful scavenging compounds.

Other olefinically unsaturated monomers besides those specifically described above may be polymerized using the catalysts according to the invention, for example, styrene, alkyl-substituted styrenes, isobutylene, ethylidene norbornene, norbornadiene, dicyclopentadiene, and other olefinically-unsaturated monomers, including other cyclic olefins, such as cyclopentene, norbomene, and alkyl-substituted norbornienes. Additionally, alpha-olefinic macromonomers of up to 1000 per units, or more, may also be incorporated by copolymerization.

The catalyst compositions of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The formation of blended polymers can be achieved ex situ through mechanical blending or in situ through the use of a mixed catalyst system. It is generally believed that in situ blending provides a more homogeneous product and allows the blend to be produced in one step. The use of mixed catalyst systems for in situ blending involves combining more than one catalyst in the same reactor to simultaneously produce multiple distinct polymer products. This method requires additional catalyst synthesis and the various catalyst components must be matched for their activities, the polymer products they generate at specific conditions, and their response to changes in polymerization conditions.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as: Me=methyl, THF, or thf,= tetrahydrofuran, and Cp*, permethylated cyclopentadienyl metal ligand.

All molecular weights are weight average molecular weight unless otherwise noted. Molecular weights (weight average molecular weight (Mw) and number average molecular weight (Mn) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for Mw/Mn which was calculated from elution times. The numerical analyses were performed using Expert Ease software available from Waters Corporation.

EXAMPLES

All reactions were performed under nitrogen in dryboxes or connected to Schlenk lines unless stated otherwise. Lithium tetramethylcyclopentadienyl was purchased from Strem and used as received. 30 wt % methylalumoxane in toluene was purchased from Albermarle and used as received. Triethylaluminum was purchased from Akzo Nobel and used as received. $HB(C_6F_5)_2$ was prepared using the method described by Piers et al. (Angew. Chem. Int. Ed. Engl. 1995, 34, 809). $Zr(NMe_2)_4$ was prepared by the method described by Jordan et al. (Organometallics 1995, 14, 5.)

Synthesis of Metallocenes

1. $CH_3(CH_2=CH)Si(Cp*H)_2$.

Lithium tetramethylcyclopentadienyl (Cp*) (20 grams) was combined with dichloromethylvinylsilane (11 grams) in 300 mls of THF. The resulting slurry was stirred three hours. The solvent was removed under vacuum. An orange oil was extracted with pentane. Distillation under a dynamic vacuum with heating removed $CH_3(CH_2=CH)Si(Cp*H)Cl$. The residual oil was used without further purification.

2. $CH_3(CH_2=CH)Si(CP*)_2Zr(NMe_2)_2$.

$CH_3(CH_2=CH)Si(Cp*H)_2$ (8.4 grams) was combined with $Zr(NMe_2)_4$ (7.2 grams) in toluene (200 mls). The solution was stirred at 90° C. overnight. The resulting solution was concentrated and pentane was added resulting in the isolation of an orange precipitate. (5 grams)

$^1$H NMR $(C_6D_6)$; 0.85 (s), 1.92 (s), 1.97(s), 2.10(s), 2.20(s), 2.95(s), 2.96(s), 5.9–6.2 (m), 6.85–7.0 (m).

3. $CH_3(CH_2=CH)Si(CP*)_2ZrCl_2$.

$CH_3(CH_2=CH)Si(CP*)_2Zr(NMe_2)_2$. (5 grams) was combined with TMSCl (>10 equivalents) in toluene (200 mls). The solution was stirred overnight. The resulting solution was concentrated and pentane was added resulting in the isolation of a yellow precipitate. (3.8 grams)

$^1$H NMR $(C_6D_6)$; 0.72 (s), 1.79 (s), 1.80(s), 2.05(s), 2.07(s), 5.8–6.1 (m), 6.5–6.7 (m).

4. $CH_3((C_6F_5)_2BCH_2CH_2)Si(Cp*)_2ZrCl_2$.

$CH_3(CH_2=CH)Si(Cp*)_2ZrCl_2$ (1.4 grams) was combined with $[HB(C_6F_5)_2]_2$ (1.0 grams) in dichloromethane (30 mls) at −30° C. The solution was warmed to room temperature. The resulting solution was concentrated and pentane was added resisting in the isolation of a yellow precipitate in quantitative yields.

$^1$H NMR $(C_6D_6)$; 0.8 (s), 1.4 (m), 1.79 (s), 1.87(s), 2.04(s), 2.09(s), 2.1 (m).

5. $CH_3(CH_2=CH)Si(IndH)_2$.

$CH_3(CH_2=CH)Si(IndH)_2$ was prepared using the procedure Jordan et al. (Organometallics 1996, 15, 4038) reported for the synthesis of $(CH_3)_2Si(IndH)_2$. An orange oil was obtained and used without further purification.

6. rac-$CH_3(CH_2=CH)Si(Ind)_2Zr(NMe_2)_2$.

$CH_3(CH_2=CH)Si(Ind*H)_2$ (8.4 grams) was combined with $Zr(NMe_2)_4$ (7.2 grams) in hexane (300 mls) and attached to an oil bubbler. The solution was stirred at reflux overnight. A dark red solution resulted. The solvent was removed under vacuum. A minimum of pentane was added and the solution was stored for several days at −30° C. 8.5 grams of ruby red crystals formed of one isomer.

$^1$H NMR $(C_6D_6)$; 0.89 (s), 2.46 (s), 2.48(s), 6.2–6.36 (m), 6.67–7.0 (m), 7.47–7.60 (m), 7.76–7.79 (m).

7. rac-$CH_3(CH_2=CH)Si(Ind)_2ZrCl_2$.

$CH_3(CH_2=CH)Si(Ind)_2Zr(NMe_2)_2$. (5 grams) was combined with TMSCl (>10 equivalents) in toluene (200 mls). The solution was stirred overnight. The resulting solution was concentrated and pentane was added resulting in the isolation of a yellow precipitate. (3.8 grams)

$^1$H NMR $(C_6D_6)$; 0.62 (s), 5.76 (d), 5.90 (d), 5.91–6.14 (m), 6.37–6.51 (m), 6.77–6.90 (m), 7.12–7.23 (m), 7.36–7.45 (m).

8. rac-$CH_3((C_6F_5)_2BCH_2CH_2)Si(Ind)_2ZrCl_2$.

$CH_3(CH_2=CH)Si(Ind)_2ZrCl_2$ (1.85 grams) was combined with $[HB(C_6F_5)_2]_2$ (1.43 grams) in dichloromethane (30 mls) at −30° C. The solution was warmed to room temperature. The resulting solution was concentrated and pentane was added resulting in the isolation of a yellow precipitate (2.7 grams).

$^1$H NMR $(C_6D_6)$; 0.72 (s), 1.37–1.44 (m), 2.08–2.14 (m), 5.80 (d), 5.90 (d), 6.77–6.94 (m), 7.08–7.39 (m).

Synthesis of Supported Catalysts.

9. Catalyst A (Comparative)

Methylalumoxane (30 wt % in toluene) (37.72 grams) was combined with 39.0 grams of toluene in a 500 ml flask. The addition of 0.80 grams of $CH_3(CH_2=CH)Si$ $(CP*)_2ZrCl_2$ formed a gold solution. After several minutes 30.0 grams of Davison 948 (600° C. treated) silica was poured into the solution. The resulting mixture was stirred by hand with a spatula for ten minutes. The supported material was dried overnight under vacuum yielding a yellow powder.

10. Catalyst B

Methylalumoxane (30 wt % in toluene) (37.72 grams) was combined with 39.0 grams of toluene in a 500 ml flask. The addition of 1.33 grams of $CH_3((C_6F_5)_2BCH_2CH_2)Si$ $(CP*)_2ZrCl_2$ formed a gold solution. After several minutes 30.0 grams of Davison 948 (600° C. treated) silica was poured into the solution. The resulting mixture was stirred by hand with a spatula for ten minutes. The supported material was dried overnight under vacuum yielding a yellow powder.

11. Catalyst C (Comparative)

Mcthylalumoxane (30 wt % in toluene) (37.72 grams) was combined with 39.0 grams of toluene in a 500 ml flask. The addition of 0.704 grams of rac-$CH_3(CH_2=CH)Si$ $(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

12. Catalyst D

Methylalumoxane (30 wt % in toluene) (37.72 grams) was combined with 39.0 grams of toluene in a 500 ml flask. The addition of 1.27 grams of rac-$CH_3((C_6F_5)_2BCH_2CH_2)$ $Si(Ind)_2ZrCl_2$ fonned a red solution. After several minutes 30.0 grams of Davison 948 (600° C. treated) silica was poured into the solution. The resulting mixture was stirred by hand with a spatula for ten minutes. The supported material was dried overnight under vacuum yielding a pink powder.

13. Catalyst E

Methylalumoxane (30 wt % in toluene) (37.72 grams) was combined with 39.0 grams of toluene in a 500 ml flask. The addition of 0.73 grams of rac-$(CH_3)_2Si(Ind)_2ZrCl_2$ formed a red solution. After several minutes 30.0 grams of Davison 948 (600° C. treated) silica was poured into the solution. The resulting mixture was stirred by hand with a spatula for ten minutes. The supported material was dried overnight under vacuum yielding a orange powder.

14. Slurry-Phase Ethylene-Hexene Polymerization using Catalyst A. (Comparative)

Polymerizations were conducted in a stainless steel, 1-liter Zipperclave autoclave reactor. The reactor was equipped with water jacket for heating and cooling. Injections were performed via a high pressure nitrogen injection. (400 mls isobutane, 15 mls of hexene, and 15 mis triethylaluminum) Before polymerizations the reactor was purged with nitrogen for several hours at 100° C. Upon injection of catalyst ethylene was fed continuously on demand keeping the reactor pressure constant (130 psig ethylene) while maintaining the reaction temperature at 85° C. After the allotted time the reaction was stopped by cooling and venting the pressure and exposing the contents of the reactor to air. The liquid components were evaporated and the poly(ethylene-co-hexene-1) resin was dried under a $N_2$ purge. Weight average molecular weight (Mw), number average molecular weight (Mn) and their ratio Mw/Mn were obtained by GPC gel permeation chromotagraphy. Hexene wt % incorporation was obtained from $^1$H NMR data.

The above procedure was performed using 25 mgs of Catalyst A. After 40 minutes the reaction was stopped. No reactor fouling was observed. Run 1; 39.9 grams of polymer resin (2660 g pol./g cat. h); Mw=74500, Mn=36200, Mw/Mn=2.61; Hexene wt %=2.7. Run 2; 35.6 grams of polymer resin (2370 g pol./g cat. h); Mw=85100, Mn=35900, Mw/Mn=2.37; Hexene wt %=2.9.

15. Slurry-Phase Ethylene-Hexene Polymerization using Catalyst B.

The polymerization was run according to the procedure outlined in experiment 13 using catalyst B. No reactor fouling was observed. Run 1; 33.7 grams of polymer resin (2250 g pol./g cat. h); Mw=89700, Mn=36500, Mw/Mn=2.5; Hexene wt %=3.0. Run 2; 24.1 grams of polymer resin (1610 g pol./g cat. h); Mw=89900, Mn=38100, Mw/Mn=2.36; Hexene wt %=2.9.

16. Slurry-Phase Ethylene-Hexene Polymerization using Catalyst C. (Comparative)

The polymerization was run according to the procedure outlined in experiment 13 using catalyst C. No reactor fouling was observed. Run 1; 35.5 grams of polymer resin (2370 g pol./g cat. h); Mw=124000, Mn=34500, Mw/Mn=3.59; Hexene wt %=6.7. Run 2; 35.6 grams of polymer resin (2370 g pol./g cat. h); Mw=153000, Mn=38200, Mw/Mn=4.00; Hexene wt %=6.0.

17. Slurry-Phase Ethylene-Hexene Polymerization using Catalyst D.

The polymerization was run according to the procedure outlined in experiment 13 using catalyst D. No reactor fouling was observed. Run 1; 113 grams of polymer resin (7530 g pol./g cat. h); Mw=102000, Mn=35300, Mw/Mn=2.89; Hexcne wt %=4.9. Run 2; 91.4 grams of polymer resin (6090 g pol./g cat. h); Mw=92400, Mn=36200, Mw/Mn=2.55; Hexene wt %=5.5.

18. Slurry-Phase Ethylene-Hexene Polymerization using Catalyst E.

The polymerization was run according to the procedure outlined in experiment 14 using catalyst D. No reactor fouling was observed. Run 1; 36.5 grams of polymer resin (2440 g pol./g cat. h); Mw=178000, Mn=42800, Mw/Mn=4.16; Hexcne wt%=5.9.

I claim:

1. A process for the preparation of polyolefins from one or more olefinic monomers comprising combining said olefin with a catalyst complex derived from:
   i) a metallocenc compound having a silicon bridging element substituted with a boron moiety containing two halogenated aromatic groups, and
   ii) an alkyl aluminum compound or aluminoxy derivative thereof; and optionally,
   iii) a support material.

2. The process according to claim 1 wherein said combining is done under gas phase, slurry, solution or supercritical high pressure coordination polymerization conditions.

3. The process according to claim 2 wherein conditions are slurry conditions and said olefinic monomers are one or more selected from the group consisting of ethylene, $C_3$–$C_{10}$ α-olefins, $C_5$–$C_{20}$ cyclic olefins, $C_5$–$C_{20}$ non-conjugated diolefins, $C_7$–$C_{20}$ vinyl aromatic olefins, and $C_4$–$C_{20}$ geminally disubstituted olefins.

4. The process according to claim 2 wherein conditions are solution polymerization conditions and said olefinic monomers are one or more selected from the group consisting of ethylene, $C_3$–$C_{10}$ (α-olefins, $C_5$–$C_{20}$ cyclic olefins, $C_5$–$C_{20}$ non-conjugated diolefins, $C_7$–$C_{20}$ vinyl aromatic olefins, and $C_4$–$C_{20}$ geminally disubstituted olefins.

5. The process according to claim 2 wherein conditions are gas phase polymerization conditions and said olefinic monomers are one or more selected from the group consisting of ethylene and $C_3$–$C_{10}$ α-olefins.

6. A process for the preparation of polyolefins from one or more olefinic monomers comprising combining said olefins with a transition metal organometallic catalyst compound represented by the formula:

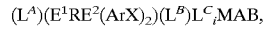

$$(L^A)(E^1RE^2(ArX)_2)(L^B)L^C_iMAB,$$

wherein, $L^A$ is a substituted cyclopentadienyl or heterocyclopentadienyl ancillary ligand π-bonded to M;

$L^B$ is a substituted cyclopentadienyl, a heterocyclopentadienyl or a heteroatom ancillary ligand bonded to M;

$E^1$ is a Group 13–15 atom bonded to $L^A$ and $L^B$;

R is $C_1$ to $C_{10}$ hydrocarbyl group linking $E^1$ to $E^2$;

$E^2$ is a Group 13 atom;

ArX is a halogenated aromatic group bonded to $E^2$;

$L^C_i$ is one or more optional, neutral non-oxidizing ligand having a dative bond to M;

i equals 0 to 3;

M is a Group 3–6 transition metal; and

A and B arc independently monoanionic labile ligands.

7. The process according to claim 6 wherein said combining is done under gas phase, slurry, solution or supercritical high pressure coordination polymerization conditions.

8. The process according to claim 7 wherein conditions are slurry conditions and said olefinic monomers are one or more selected from the group consisting of ethylene, $C_3$–$C_{10}$ α-olefins, $C_5$–$C_{20}$ cyclic olefins, $C_5$–$C_{20}$ non-conjugated diolefins, $C_7$–$C_{20}$ vinyl aromatic olefins, and $C_{4-C20}$ geminally disubstituted olefin.

9. The process according to claim 7 wherein conditions are solution polymerization conditions and said olefinic monomers are one or more selected from the group consisting of ethylene, $C_3$–$C_{10}$ α-olefins, $C_5$–$C_{20}$ cyclic olefins, $C_5$-$C_{20}$ non-conjugated diolefins, $C_7$–$C_{20}$ vinyl aromatic olefins, and $C_4$–$C_{20}$ geminally disubstituted olefins.

10. The process according to claim 7 wherein conditions are gas phase polymerization conditions and said olefinic monomers are one or more selected from the group consisting of ethylene and $C_3$–$C_{10}$ α-olefins.

* * * * *